United States Patent
Drexler et al.

(10) Patent No.: US 10,675,635 B1
(45) Date of Patent: Jun. 9, 2020

(54) HARDWARE SANITIZATION AND DESTRUCTION MACHINE

(71) Applicant: Amazon Technologies, Inc., Seattle, WA (US)

(72) Inventors: Shane Drexler, Seattle, WA (US); John William Eichelberg, Spokane, WA (US); Michael P. Czamara, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1045 days.

(21) Appl. No.: 14/736,609

(22) Filed: Jun. 11, 2015

(51) Int. Cl.
| | |
|---|---|
| *B02C 25/00* | (2006.01) |
| *B02C 19/00* | (2006.01) |
| *G11B 5/024* | (2006.01) |
| *G11B 23/50* | (2006.01) |
| *B02C 18/00* | (2006.01) |

(52) U.S. Cl.
CPC .............. *B02C 25/00* (2013.01); *B02C 18/00* (2013.01); *B02C 19/0056* (2013.01); *G11B 5/0245* (2013.01); *G11B 23/505* (2013.01); *B02C 18/0076* (2013.01)

(58) Field of Classification Search
CPC . B02C 19/0056; B02C 25/00; B02C 2018/00; B02C 2018/0015; G11B 5/0245; G11B 23/505; G06Q 10/087; B25J 5/00; B25J 5/007; B25J 11/0045; B25J 11/008; B25J 11/0095; B65G 1/0492; B65G 1/137; B65G 1/1371; G05D 1/0242
USPC ......................................................... 241/25
See application file for complete search history.

(56) References Cited

U.S. PATENT DOCUMENTS

| | | | | |
|---|---|---|---|---|
| 8,064,183 B2 * | 11/2011 | Olliges | ................. | H01F 13/006 361/143 |
| 8,364,306 B2 * | 1/2013 | Rodriguez | .......... | B02C 18/0007 221/1 |
| 9,430,654 B1 * | 8/2016 | Rajaie | ..................... | B02C 25/00 |
| 9,947,343 B1 * | 4/2018 | Crook | .................... | G11B 5/024 |
| 2003/0146275 A1 * | 8/2003 | Bennett | .................. | G07F 7/086 235/376 |
| 2007/0057099 A1 * | 3/2007 | Kubo | .................. | B02C 18/0007 241/101.2 |

(Continued)

OTHER PUBLICATIONS

"Mobile Degauss and Destroy Duos," Aug. 2014, Data Storage, Inc. URL: http://datasecurityinc.com/degausser/mobilehard-drivedestructionduo.html (Year: 2014).*

(Continued)

*Primary Examiner* — Shelley M Self
*Assistant Examiner* — Katie L. Parr
(74) *Attorney, Agent, or Firm* — BakerHostetler

(57) ABSTRACT

An apparatus for disposal of electronic devices includes a transport mechanism for transferring the storage devices through the apparatus. A scanner scans or reads the devices as the devices move through the apparatus, a sanitizer for degaussing or erasing the storage devices, and a destruction mechanism for physically deforming the devices. The apparatus is further configured to receive scanned information from the scanner, determine identification information for the devices based on the scanned information, and update status information of the devices during movement of the devices between the scanner, sanitizer, and destruction mechanism.

9 Claims, 9 Drawing Sheets

(56) References Cited

U.S. PATENT DOCUMENTS

| | | | |
|---|---|---|---|
| 2007/0147776 A1* | 6/2007 | Ito | B02C 18/0007 |
| | | | 386/254 |
| 2012/0091237 A1* | 4/2012 | Clark | G11B 5/0245 |
| | | | 241/23 |
| 2014/0209723 A1* | 7/2014 | Ebadian | B02C 18/24 |
| | | | 241/35 |
| 2014/0263216 A1* | 9/2014 | Clark | B23C 1/08 |
| | | | 219/121.7 |
| 2015/0328642 A1* | 11/2015 | Shegerian | B02C 18/16 |
| | | | 241/30 |

OTHER PUBLICATIONS

"PD-8700 Hard Drive Degausser & Destroyer"; Garner Products; 2 pages.

Barcode Scanning for Computer Tape & Hard Drive Destruction; http://rmsshredding.com/barcode-scanning-benefits-for-on-site-computer-tape-hard-drive-destruction-services/; RMS Mobile Data Shredding; 2014; accessed Jun. 11, 2015; 2 pages.

* cited by examiner

HARDWARE SANITIZATION AND DESTRUCTION MACHINE

BACKGROUND

A data center is a facility that houses computer systems and various networking, storage, and other related components. Many organizations and businesses utilize data center resources to provide computing and information services to support their day-to-day operations. Data centers may provide computing services to businesses and individuals as a remote computing service or to provide "software as a service" (e.g., cloud computing). The services provided by data centers are valuable to customers, and the protection of customers' data is important to the customers' services and operations. It is also important to protect customers' data when performing maintenance activities for data storage and other devices.

BRIEF DESCRIPTION OF DRAWINGS

References are made to the accompanying drawings that form a part hereof, and that show, by way of illustration, specific embodiments or examples. The drawings herein are not drawn to scale. Like numerals represent like elements throughout the several figures. In the figures, reference numbers may be reused to indicate correspondence between referenced elements. The drawings are provided to illustrate example embodiments described herein and are not intended to limit the scope of the disclosure.

DETAILED DESCRIPTION

Figure 1:
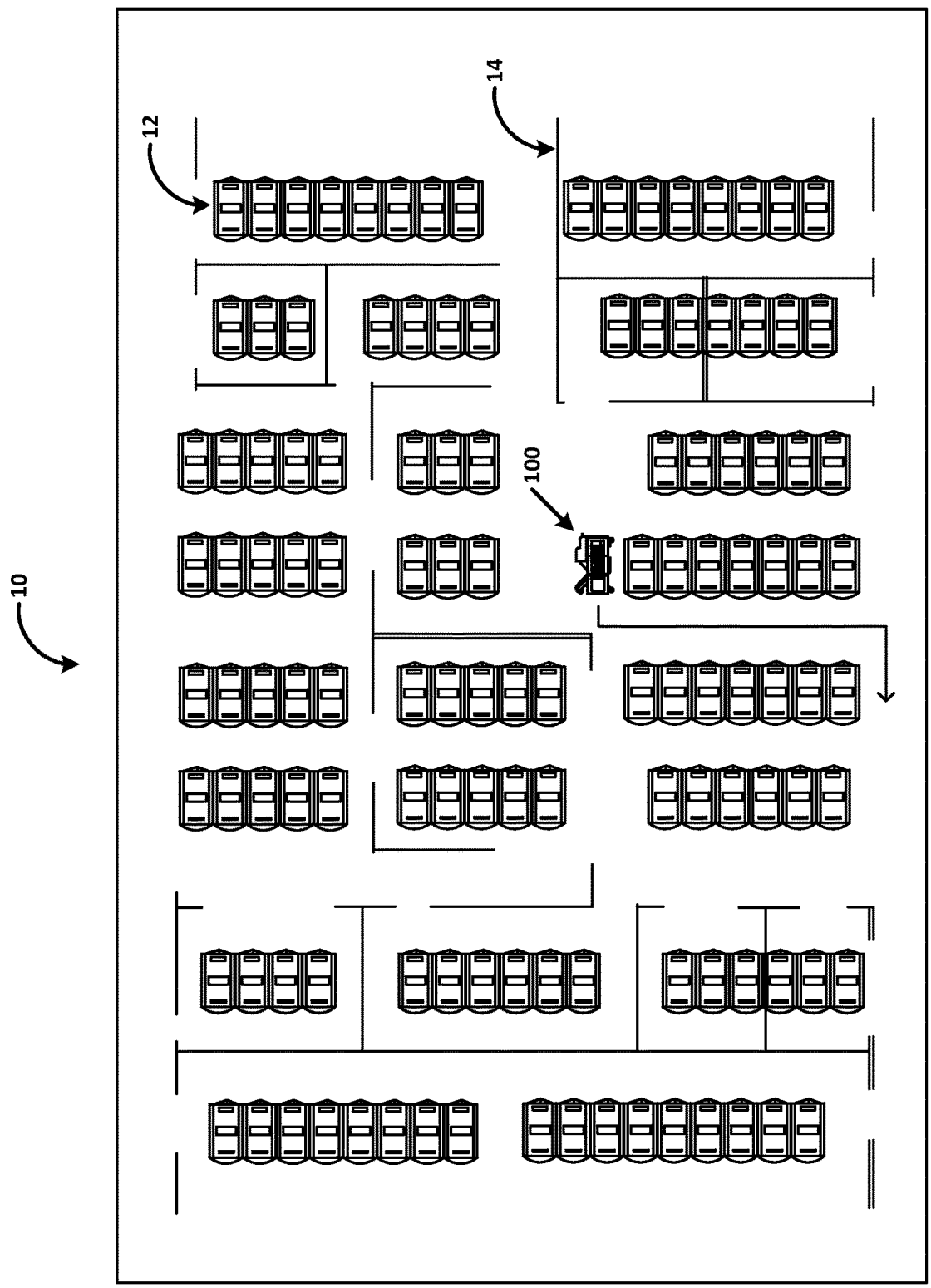
FIG. 1 illustrates an example data center and integrated apparatus for disposal of devices according to some embodiments.

A data center provides computing resources to users via user computers over a communications network such as the Internet. The computing resources can include various types of resources, such as data processing resources, data storage resources, data communication resources, and the like. Data centers typically serve many hundreds or thousands of customers, and can house thousands of servers and other computing equipment. For example, a data center may be housed in a structure spanning tens of thousands of square feet, where hundreds or thousands of equipment racks can house thousands of servers and other computing devices.

The secured availability of computing services provided by data centers are important to the ongoing operations of the data center's customers. Security is an important concern not only for service reliability but also for the protection of a customer's valuable and proprietary information. A data center should therefore implement a reliable and secure computing environment in order to provide such protections.

The operation of a data center requires the continuous monitoring and maintenance of the data center's equipment. One piece of equipment in a data center that requires specific handling after a failure is the storage device (e.g., hard disk drive, solid state storage, media storage device, etc.). When a storage device has run through its life cycle, when a storage device fails, or when a storage device must otherwise be replaced, a technician typically locates the failed storage device, removes the storage device, and places the storage device in a process for sanitization (e.g., erasure) and destruction of the device. Because of the importance of maintaining the security and privacy of the customers' data, the data center's processes for replacement and disposal of storage devices must be robust and secure. Unauthorized access to an improperly disposed storage device can result in the misappropriation of significant amounts of customers' data, the unauthorized access to which should be minimized or eliminated.

Another consideration for the protection of customer data is that the data center typically houses many thousands of components such as servers and disk storage devices. Because of the large number of disk storage devices that are typically removed for sanitization and destruction during the normal operations of a data center, it can become increasingly time-consuming and logistically difficult to properly and securely remove, identify, sanitize, and destroy a large number of disk storage devices. For example, issues can occur if the wrong disk storage device is removed and destroyed, or if a correct disk storage device is removed but the data center cannot verify that the disk storage device has been destroyed. The results of such mishaps can include loss of customer data, extra cost incurred by the data center or customer due to the loss of a disk storage device, customer dissatisfaction, and so on.

Disk storage devices that are selected for destruction and disposal must be properly identified, and it must further be verified that an identified disk storage device has indeed been selected for destruction and disposal by the data center. Once properly identified and verified, the selected disk storage device may be sanitized. Sanitization refers to the removal or destruction of data stored on a storage device so that any residual data is irretrievable even with forensic data recovery tools, such as by erasure. Erasure can be performed by hardware or software tool that erases stored data. Erasure can also be performed by degaussing, i.e., the disk storage device may be electrically or magnetically erased. Otherwise a process must be invoked to make irretrievable any data stored on the disk storage device. Furthermore, in many cases it is desirable, as an added security measure, to physically deform or otherwise destroy the disk storage device so that it is not possible to operate the disk storage device. In this way, access to any data on a removed disk storage device can be made difficult or impossible, thus preventing the unintended exposure of customer data.

Data that is stored on a medium such as a disk drive can remain on the medium long after the medium has been removed and discarded. If the disk drive is later retrieved, it may be possible to extract data from the disk drive's medium. Such data, if retrieved, may include private and sensitive information for a company's customers, proprietary and competition-sensitive data, and other data that may be an embarrassment for the company or provide a competitive advantage to the company's competitors. It would be useful if the removal, storage, sanitizing, and destruction of data storage devices in a data center could be performed in an efficient and integrated manner so that proper identification and verification of disk drives and other storage devices could be maintained during the removal, storage, sanitizing, and destruction operations and performed using a single integrated system.

When the removal, storage, sanitizing, and destruction operations are not performed in an integrated fashion, security of the data center's customer data may be compromised. For example, if storage, sanitizing, and destruction operations are performed separately from identification, verification, and inventory management functions, it can be time-consuming to perform such operations for the large numbers of disk storage devices that are typically disposed of on a regular basis in a data center. A data center may occupy a large amount of space, with numerous rows of equipment racks that may be separated by various rooms, walls, and other structures. A large amount of space must be traversed to access storage devices that are to be removed and replaced, while at the same time identifying and tracking the removed storage devices. Providing a secure chain of custody may thus be difficult to implement, allowing for the possible introduction of errors and an increase in the risk of inadvertent loss or exposure of customer data.

The present disclosure describes a system that is configured to receive, identify, track, sanitizing, and destroy a plurality of disk drive assemblies in an integrated manner. Referring to FIG. 1, illustrated is a data center 10 that includes a plurality of computing equipment racks 12. The computing equipment racks 12 may be situated throughout the data center 10, each of which may house a number of storage devices. The data center 10 may house hundreds or thousands of such computing equipment racks 12 in various configurations, and the computing equipment racks 12 may be further segregated into rooms, bays, or other such structures 14. When a number of storage devices from various rack locations have been identified for removal and disposal, a technician must typically traverse various computing equipment racks 12 of data center 10 to locate the identified storage devices, verify their identities, and maintain secure custody of the identified storage devices after their removal. FIG. 1 depicts an example integrated system 100 that may be utilized to process the identified storage devices immediately upon identifying and removing a storage device. There is therefore no need to first perform identification and collection of the identified storage devices and then transport the identified storage devices to another location for sanitizing and destruction, with the accompanying risk of loss, theft, or misplacement.

In some embodiments, the integrated system 100 may include a scanner/reader for scanning/reading the storage devices. The integrated system 100 may also include a computing device and a network adapter or other communications device, allowing for communication with inventory systems of the data center to identify and verify that removed storage devices have been selected to be destroyed and disposed. The integrated system 100 may also include subsystems for sanitizing removed storage devices after identification and verification of the removed storage devices. The integrated system 100 may further include subsystems for physically destroying the disk storage devices. By providing an integrated system that can perform the described operations of receiving storage devices, scanning the storage devices, identifying the storage devices, communicating with inventory systems of the data center to identify and verify the received storage devices, and sanitizing and physically destroying the storage devices, the disposal of large numbers of storage devices of a data center may be performed more efficiently, with less error, and with greater security for customers' data.

While the present disclosure describes examples in terms of storage devices such as disk drive assemblies, it should be understood that the disclosed principles may be applied to other types of devices and environments where efficient and secure disposal of equipment is desired. At least some of the disclosed embodiments can be used for disposal of electronic devices generally, including not only storage devices but also computing devices (e.g., portable computers, personal computers, servers, cell phones, smartphones, tablet computers, and other devices).

Figure 2:
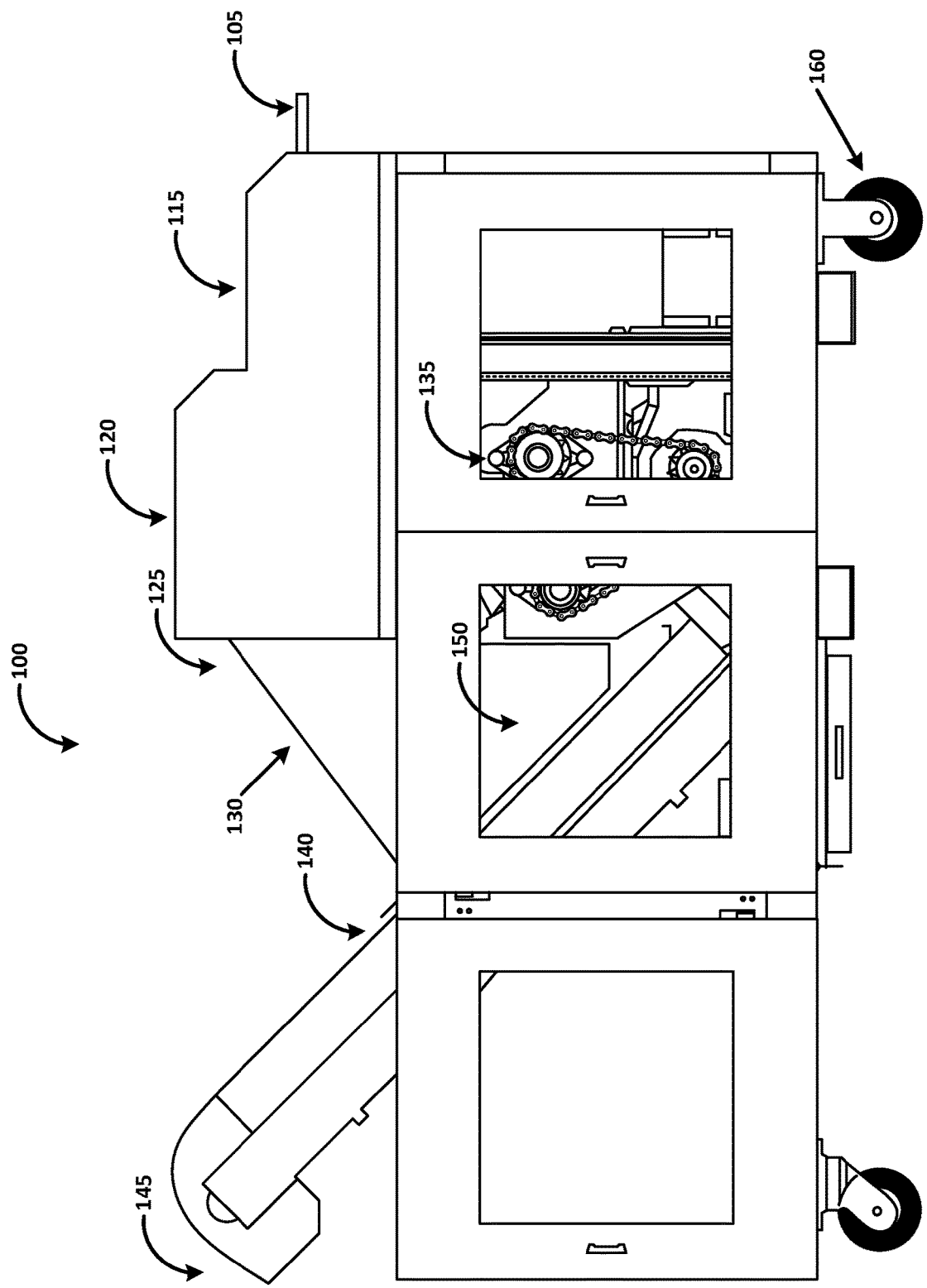
FIG. 2 illustrates an example integrated apparatus for disposal of devices according to some embodiments.

Referring to FIG. 2, illustrated is an example integrated system 100 for the destruction and/or disposal of storage devices. In an embodiment, integrated system 100 can perform the operations of receiving disk storage devices, scanning/reading the disk storage devices, identifying the disk storage devices, communicating with inventory systems of the data center to identify and verify the received disk storage devices, sanitizing the received disk storage devices, and physically destroying the received disk storage devices. The integrated system 100 may further be capable of communicating with networks and systems of the data center to send and receive information for identification and verification of disk storage devices, and providing notifications that the received disk storage devices have been destroyed and disposed. The integrated system 100 may also include subsystems for sanitizing and physically destroying the disk storage devices.

Referring to FIG. 2, a storage device 105 (e.g., hard disk drive, solid-state drive (SSD), or other storage device) may be placed into a receiving end 115 of the integrated system 100. The receiving end 115 may be any receiving mechanism for receiving a plurality of storage devices. For example, the receiving end 115 may include an opening that is shaped to receive the form factor for typical disk storage devices that is prevalent in the industry, such as a 3.5 inch form factor. This can prevent the inadvertent insertion of other types of devices or disk storage devices with different form factors.

The storage device 105 may be moved via a transport mechanism (not shown) to a sanitizing component 120 that is configured to sanitize the storage device 105. The transport mechanism may comprise a moving belt that moves the disk storage devices to the next part of the integrated system 100. The sanitizing component 120 may be configured to delete, erase, or otherwise make irretrievable the data that is stored on the storage device 105 using magnetic, optical, electrical, or other means on the storage device 105. For example, the sanitizing component 120 may comprise a degaussing component that may cause electrical or magnetic erasure of the storage device 105. For example, the sanitizing component 120 may apply an alternating field or a unidirectional field to cause randomization of magnetic domains on the magnetic media of the storage devices. In some embodiments, the sanitizing component 120 may include a magnetic field generator implemented by a coil that creates an alternating electromagnetic field, capacitors that release stored energy to a coil to generate an electromagnetic pulse, a magnet, or a combination thereof. In some embodiments, the sanitizing component 120 may comprise an off-the-shelf degaussing apparatus that is certified to meet National Security Agency (NSA) requirements for erasure of magnetic storage devices. For storage devices that include other types of storage that cannot be erased using a degausser, then the sanitizing component 120 may incorporate other sanitization methods such as a data writer that writes random or predetermined bits onto the storage device. After sanitization, the device may continue on the apparatus 100 for physical destruction. The storage device 105 exits the sanitizing component 120 at exit point 125 and is received by a scanning/reading component 130, where the storage device 105 is scanned or read to detect a code such as a bar code or an identification device such as a radio-frequency identification (RFID) tag.

In one embodiment, the scanning/reading component 130 may be configured to optically scan the storage device 105 and identify the storage device 105 based on the optical scanning. Storage devices, such as hard disk drives, typically include a machine-readable tag that represents data associated with the hard disk drive. In some embodiments, the information-storing tag may include an RFID tag that stores thereon data associated with the storage device. In further embodiments, the information-storing tag may include a text label, a numerical label, or an optical code (e.g., a one-dimensional optical code, such as a bar code, or a multi-dimensional optical code, such as a QR code) that stores such data. The scanning/reading component 130 may include an appropriate optical scanner, camera element, RFID reader, other component, or a combination thereof, that is configured to detect and read the optical codes, RFID tags, or other identifying information on the storage device 105.

The scanning/reading component 130 may include an identification and management component that is configured to receive the scanned information, if present on the storage device 105, and determine an identity of the storage device 105. The identification and management component may be implemented, for example, by a computing device that includes a processor and memory. The memory may include instructions that, when executed by the processer, cause the computing device to receive the scanned information and determine an identity of the storage device 105.

The scanned information may include manufacturer name and serial number for the storage device 105. The identification and management component may also be configured to maintain identification of storage devices during movement of the storage devices between the receiving end 115, sanitizing component 120, scanning/reading component 130, and deforming component 135. In some embodiments, the identification and management component may be configured to determine identifier information from scanned/read storage devices and match the identifier information with data indicative of storage devices that have been identified for disposal. For example, the integrated system 100 may include a wired or wireless network interface component that is configured to communicate with available networks using technologies, such as WI-FI or BLUETOOTH, and exchange information with other systems of the data center. The identification and management component may send information for identified storage devices so that the storage devices can be confirmed by the data center as having been selected for disposal and destruction. Because of the potentially large number of storage devices that may be identified for disposal, the identification and management component may parse through a database or listing of storage devices to identify and status the storage devices that are received for disposal.

For example, the identification and management component may access a database of storage devices that have been selected for disposal, query the database for storage devices that have been selected for removal and disposal within a specified time range, and confirm that the identified storage devices match the data in the database. The storage devices of a data center may be uniquely identified at the data center and the identification and management component may provide status information for the identified storage devices. In some embodiments, the identification and management component may be responsible for generating a database of storage devices that have been inserted into the integrated system 100 for disposal. This may be useful if the integrated system 100 is used to provide primary inventory management functions for removal and disposal of the storage devices.

When a storage device is not identified as having been selected for disposal and destruction, or if a storage device cannot otherwise be identified (e.g., the barcode information is covered or unreadable), then such a storage device may be ejected into holding bin 150 for handling by appropriate personnel. In the described embodiment, the storage device may be scanned after it is sanitized in order to help avoid any data security concerns since the storage device has already been removed from its operational location. However, it should be understood that the order and arrangement of the described components and functions may be modified. For example, in some embodiments, the storage devices may be scanned/read and identified prior to sanitization.

The deforming component 135 may be a destruction mechanism for physically deforming the storage device 105 or otherwise physically altering the storage device 105 so as to render the storage device 105 physically inoperable. This can be accomplished by subjecting the storage device 105 to extreme pressure from a bending or punching device, resulting in a deformed media element that is difficult or impossible to operate and thus prevent access to any data that may remain on the storage device 105. As shown in FIG. 2, deforming component 135 includes a number of rotating impact components, such as crushing gears that operate to deform the storage device 105 as it moves through the components. In some embodiments, the deforming component 135 may be sized and configured to automatically deform storage devices at a continuous rate, allowing for disposal of large numbers of storage devices at the data center. In one embodiment, the deforming component may be configured to pulverize or cut up the storage device 105 into a plurality of pieces to ensure that any data remaining on the storage device will be nearly impossible to recreate.

The storage device 105 may be transported between various components of the integrated system 100 via a transport mechanism 140. The transport mechanism 140 may be operable to transfer the storage device 105 between the receiving end 115, scanning/reading component 130, sanitizing component 120, and deforming component 135. The transport mechanism 140 may also be operable to transfer the storage device 105 from the deforming component 135 to the disposal end 145, where the deformed storage device 105 may be discharged from the apparatus 100 for collection and disposal. The apparatus 100 may also include rolling elements 160 that allows the apparatus 100 to be moved over a flat surface. Rolling elements 160 allows the apparatus 100 to be easily moved throughout the data center to collect storage devices as they are removed from equipment racks. The rolling elements 160 may also be motorized to facilitate movement of the apparatus 100. Because of the large size of the data center and the amount of equipment that it contains, as described with regard to FIG. 2, it may be advantageous to be able to easily move the apparatus 100 to locations where the storage devices are currently installed. By moving the apparatus 100 to the location of the storage device, security may be improved because the storage device can be placed directly into the apparatus 100 after removal, allowing for immediate scanning, identification, verification, sanitizing, and destruction while minimizing the possibility of loss or misplacement. If the storage devices need to be moved to a collection point before sanitizing and destruction, then the opportunities for a storage device with sensitive information to be compromised may increase.

Figure 3:
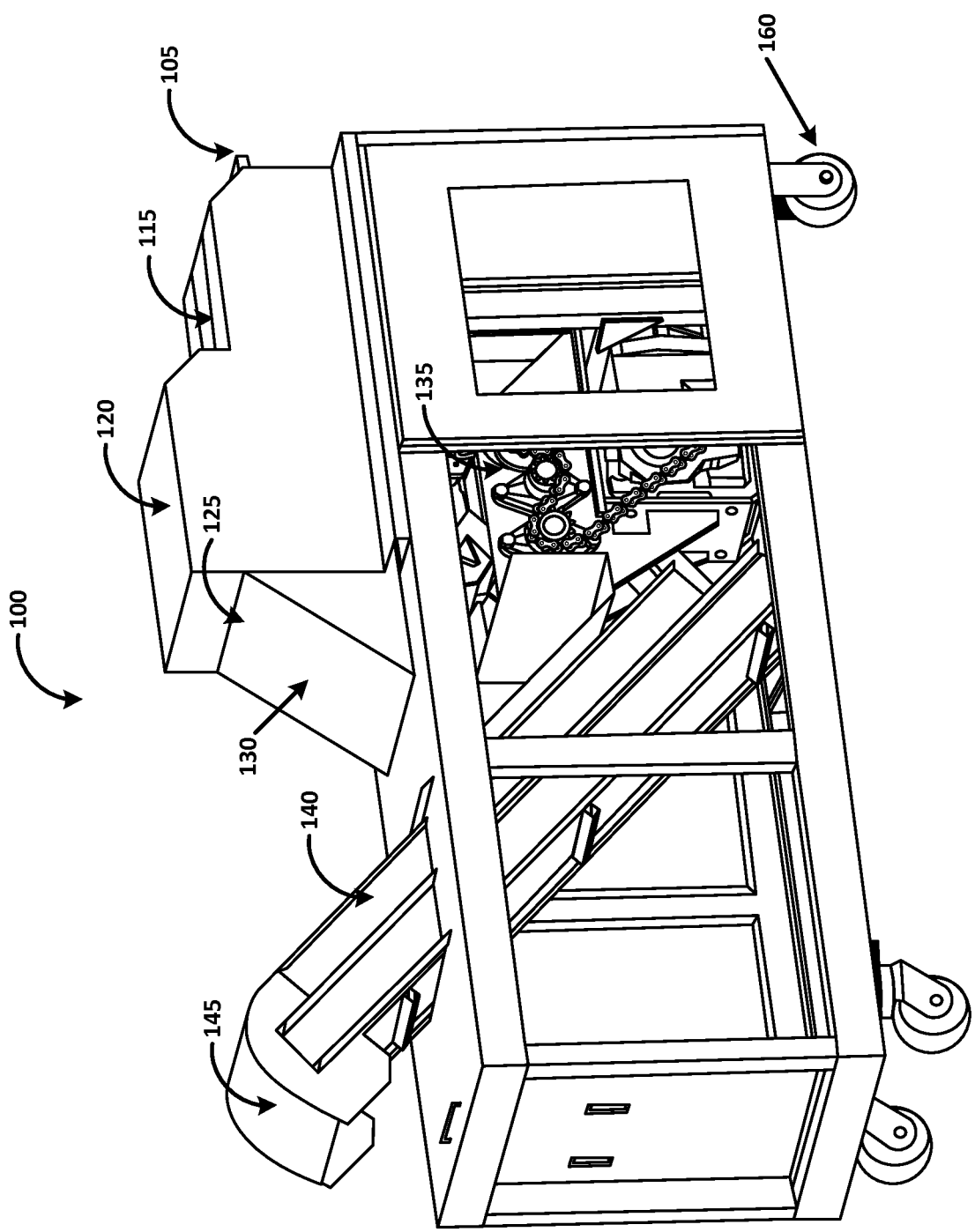
FIG. 3 illustrates another example of an integrated apparatus for disposal of devices according to some embodiments.

FIG. 3 illustrates another perspective of the apparatus 100. The figure shows the exit 125 of storage devices from sanitizing component 120 into the scanning/reading component 130. FIG. 3 illustrates that the transport mechanism of apparatus 100 may be implemented as a series of belts, causing movement of the storage device 105 through the receiving end 115, sanitizing component 120, and ejection of the storage device 105 at exit point 125 into the scanning/reading component 130 and deforming component 135. Movement of the transport mechanism may be effectuated automatically in response to insertion of the storage device 105 into the receiving end 115, by operation of a power switch (not shown) on the apparatus 100, or by other controls provided on the apparatus 100.

Figure 4:
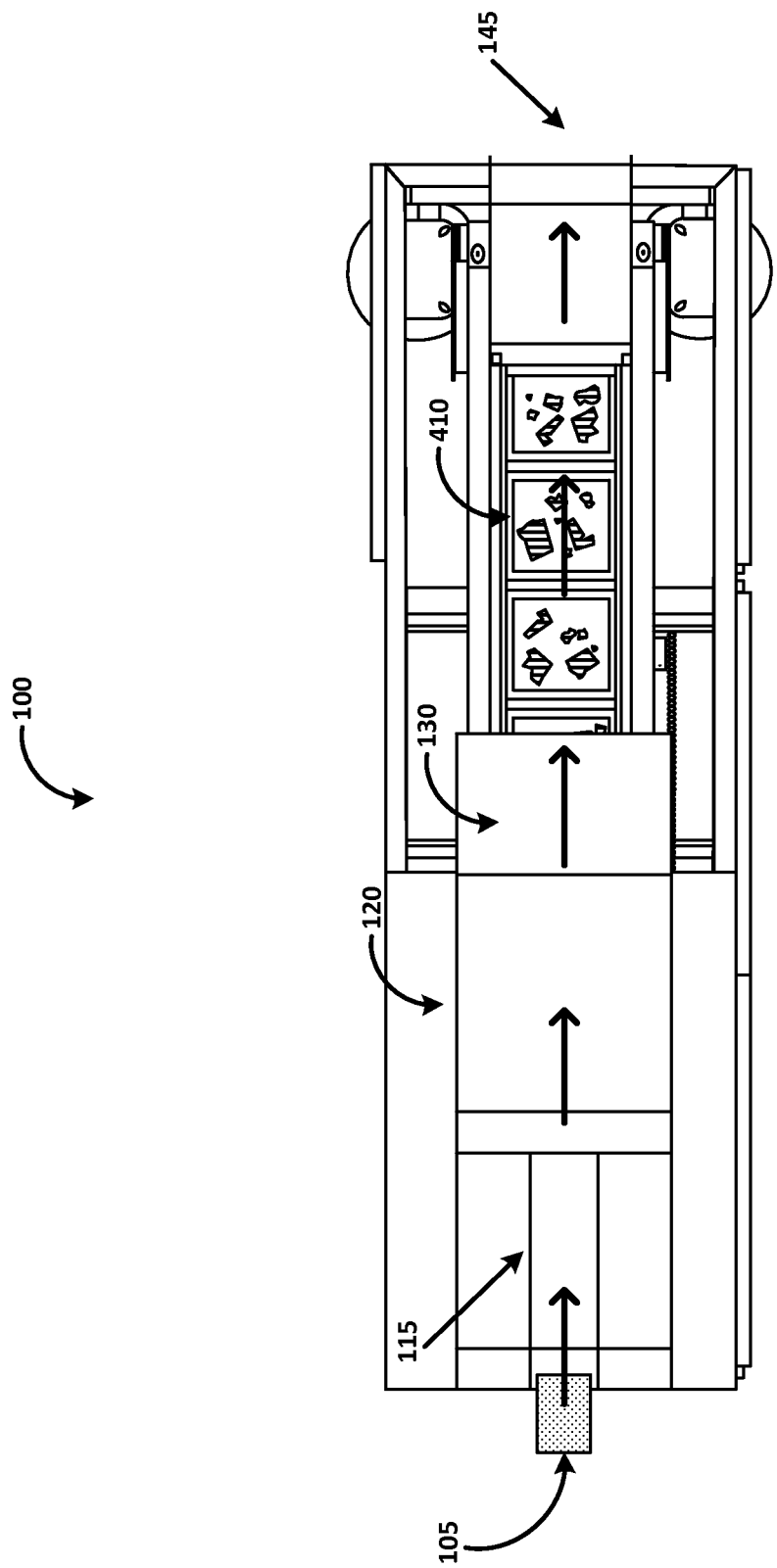
FIG. 4 illustrates another example of an integrated apparatus for disposal of devices according to some embodiments.

FIG. 4 illustrates a top-down view of the apparatus 100. Storage device 105 enters apparatus 100 via receiving end 115, and the transport mechanism 140 moves the storage device 105 through the sanitizing component 120 and scanning/reading component 130. FIG. 4 also illustrates the deformed or destroyed storage devices 410 as the transport mechanism moves the deformed or destroyed storage devices 410 from the exit point of the deforming component 135 to the disposal end 145. While FIG. 4 illustrates the deformed or destroyed storage devices 410 as multiple pieces of the storage device 105, in some embodiments the deforming component 135 may be configured to deform the storage device 105 without breaking up the storage device 105, allowing for potential recycling of the components of the storage device 105.

Figure 5:
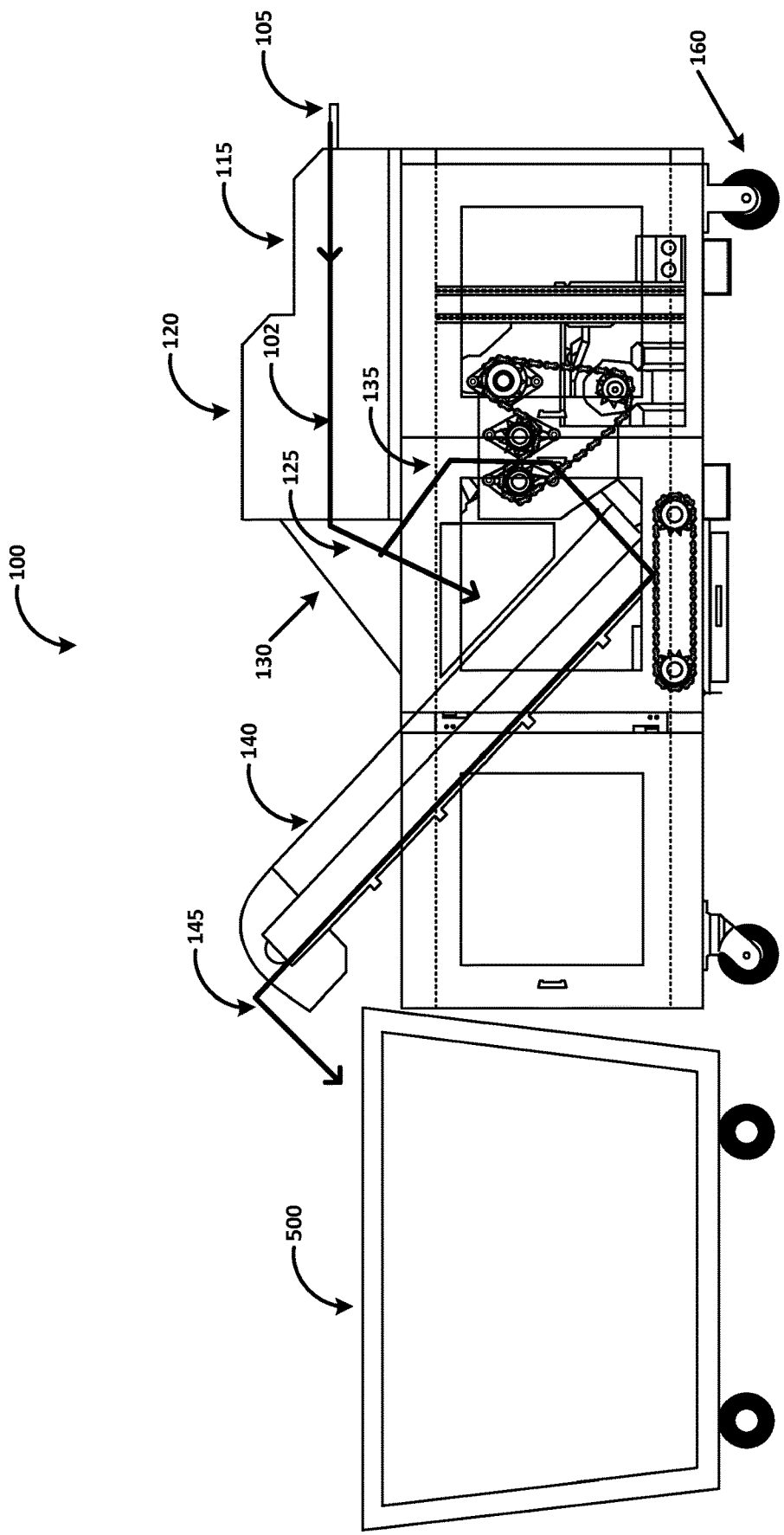
FIG. 5 illustrates another example of an integrated apparatus for disposal of devices according to some embodiments.

FIG. 5 illustrates the path of movement, as indicated by the bolded line 102, of storage device 105 through the apparatus 100 in one embodiment. As shown, storage device 105 moves from the receiving end 115 through the sanitizing component 120. Storage device 105 exits from the sanitizing component 120 and may be moved to the scanning/reading component 130. FIG. 5 further illustrates the discharge 125 of storage device 105 after scanning/reading by the scanning/reading component 130 if the storage device 105 cannot be scanned/read or if the storage device 105 cannot be identified as having been selected for destruction. If the storage device 105 is scanned/read and identified, then storage device 105 may proceed to the deforming component 135. FIG. 5 also illustrates the discharge of storage device 105 after the storage device 105 is deformed by the destruction component 135. The transport mechanism 140 moves the storage device 105 from the output of deforming component 135 to disposal receptacle 500, which may be employed to collect deformed devices for subsequent removal and disposal.

Figure 6:
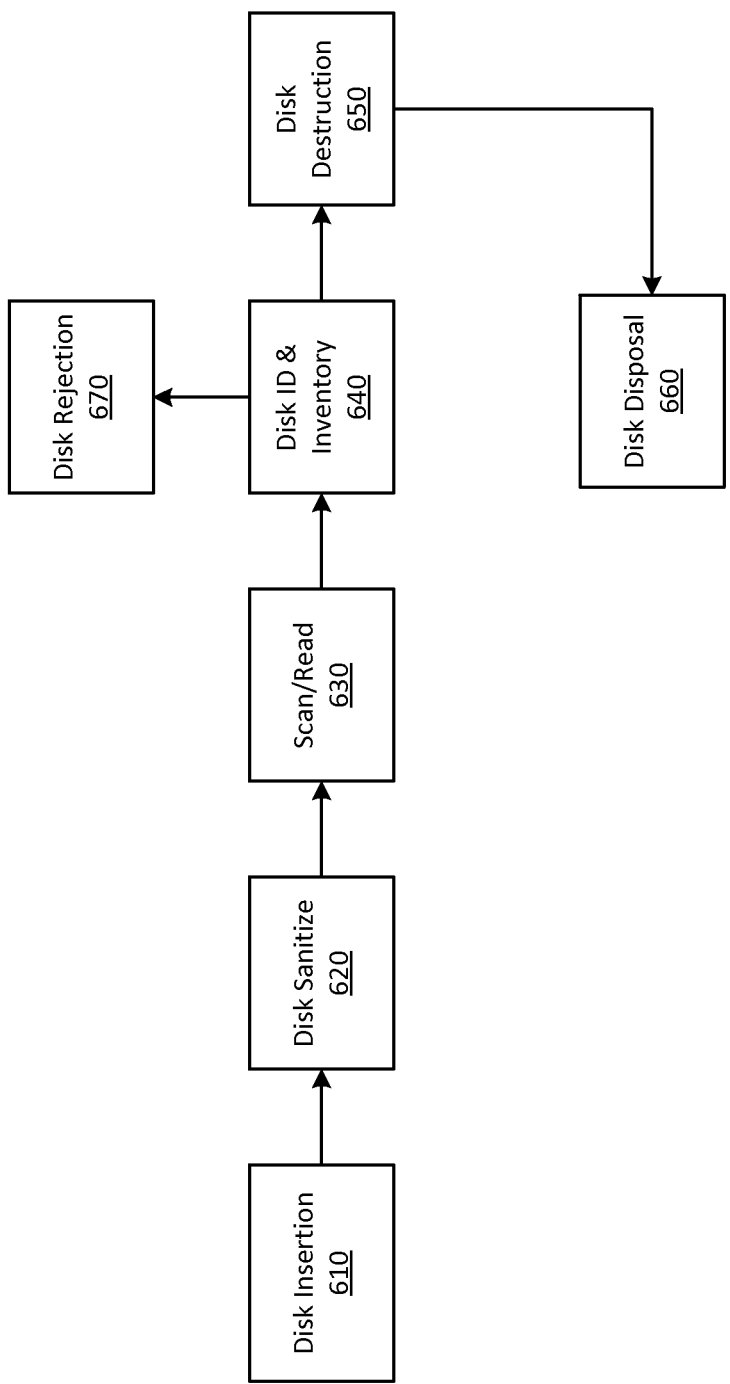
FIG. 6 illustrates a functional diagram of an integrated apparatus for disposal of devices according to some embodiments.

FIG. 6 illustrates functionality of an integrated system for destroying a computing or storage device. An insertion function 610 may be provided to receive the computing or storage device. Sanitizing 620 may be performed, where the contents of any media on the storage device may be erased, overwritten, and/or randomized using magnetic, electrical, or other techniques. After sanitizing 620, then a scan/read 630 may be performed to obtain information contained in a barcode or other encoded or stored information. Based on output from the scan/read 630, identification and inventory functions 640 may be performed. The information obtained from the scan/read 630 may be used to identify an inserted storage device and verify the information with other systems of the data center. Identification and inventory functions 640 may be followed by destruction 650 of the computing or storage device, which may comprise physically deforming, cutting, pulverizing, burning, or other physically destructive measures. Finally, a disposal function 660 may be performed to collect the output from the destruction function 650. In some embodiments, a rejection function 670 may be provided that may reject an inserted storage device if the storage device is the wrong form factor, if the inserted storage device cannot be scanned, or if the inserted storage device cannot be identified or verified. As mentioned, the order of the described functionality may be modified. For example, in some embodiments the scan/read function 630 and identification and inventory function 640 may be performed prior to the disk sanitization function 620.

Figure 7:
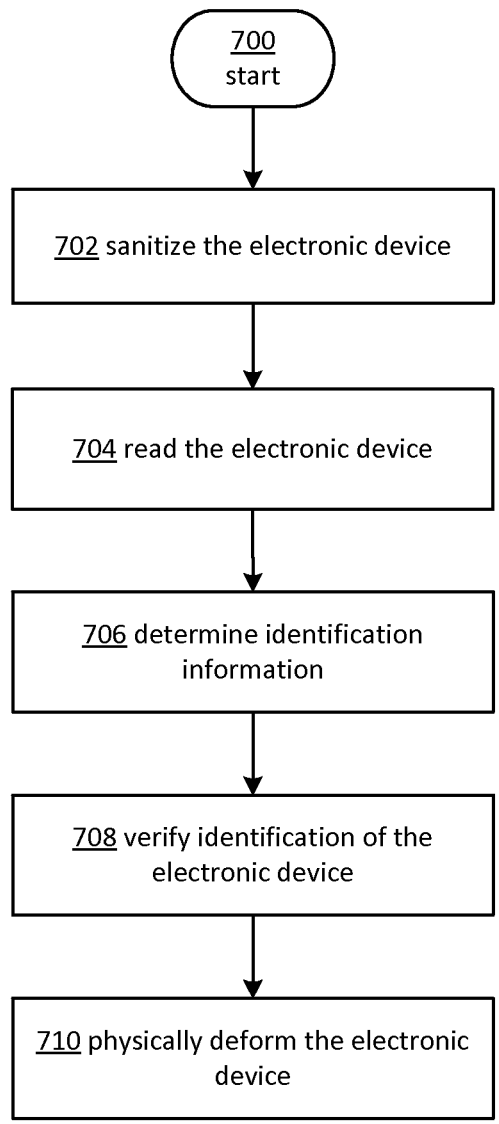
FIG. 7 is an example of an operational procedure for disposal of devices in accordance with the present disclosure.

FIG. 7 illustrates an example operational procedure for destroying an electronic device. In an embodiment, destruction and/or disposal of an electronic device, such as a disk drive assembly, may be performed by an integrated system for destroying electronic devices, such as apparatus 100 illustrated in FIGS. 1-5 and implemented by the operations illustrated in FIG. 7, which begins with operation 700 to start the operational procedure. Operation 700 may be followed by operation 702. Operation 702 illustrates sanitizing the electronic device. In one embodiment, the sanitizing may comprise degaussing and can be implemented by a suitable device for demagnetizing or magnetically neutralizing the contents of the electronic device. This can be caused by an appropriate device that generates a magnetic field sufficient to reset the media on the electronic device. Operation 702 may be followed by operation 704. Operation 704 illustrates reading an information-storing tag of the electronic device. The reading can be performed by a component such as an optical scanner or camera element that is part of scanning/reading component 130 of FIGS. 1-5, for example.

Operation 704 may be followed by operation 706. Operation 706 illustrates determining identification information associated with the electronic device. The identification information can be determined from the reading performed in operation 704. In some embodiments, the reading may comprise reading an RFID tag or scanning an optical code. The identification information may include manufacturer name, serial number, and other information associated with the storage device 105.

Operation 706 may be followed by operation 708, which illustrates verifying identification of the electronic device prior to deforming. In some embodiments, the identifier information may be matched with data indicative of electronic devices that have been identified for disposal. For example, the integrated system may communicate with available networks and exchange information with other systems of the data center to confirm that the scanned electronic device has been selected for disposal and destruction.

Operation 708 may be followed by operation 710, which illustrates physically deforming the electronic device.

In some embodiments, the electronic device may be automatically transferred between components of the integrated system during the scanning, sanitizing, and deforming operations.

In some embodiments, if the inventory control system does not have a database of electronic devices that are identified for destruction, then the integrated system may generate a database of electronic devices that are received.

The integrated system may transfer the destroyed electronic devices to a disposal container. In some cases, an electronic device may be identified that is not indicated as being selected for destruction. The integrated system may take actions, such as generating a notification, prior to the deforming operations. The integrated system may also temporarily halt operation of the system so that the electronic device in question may be removed for further investigation.

Figure 8:
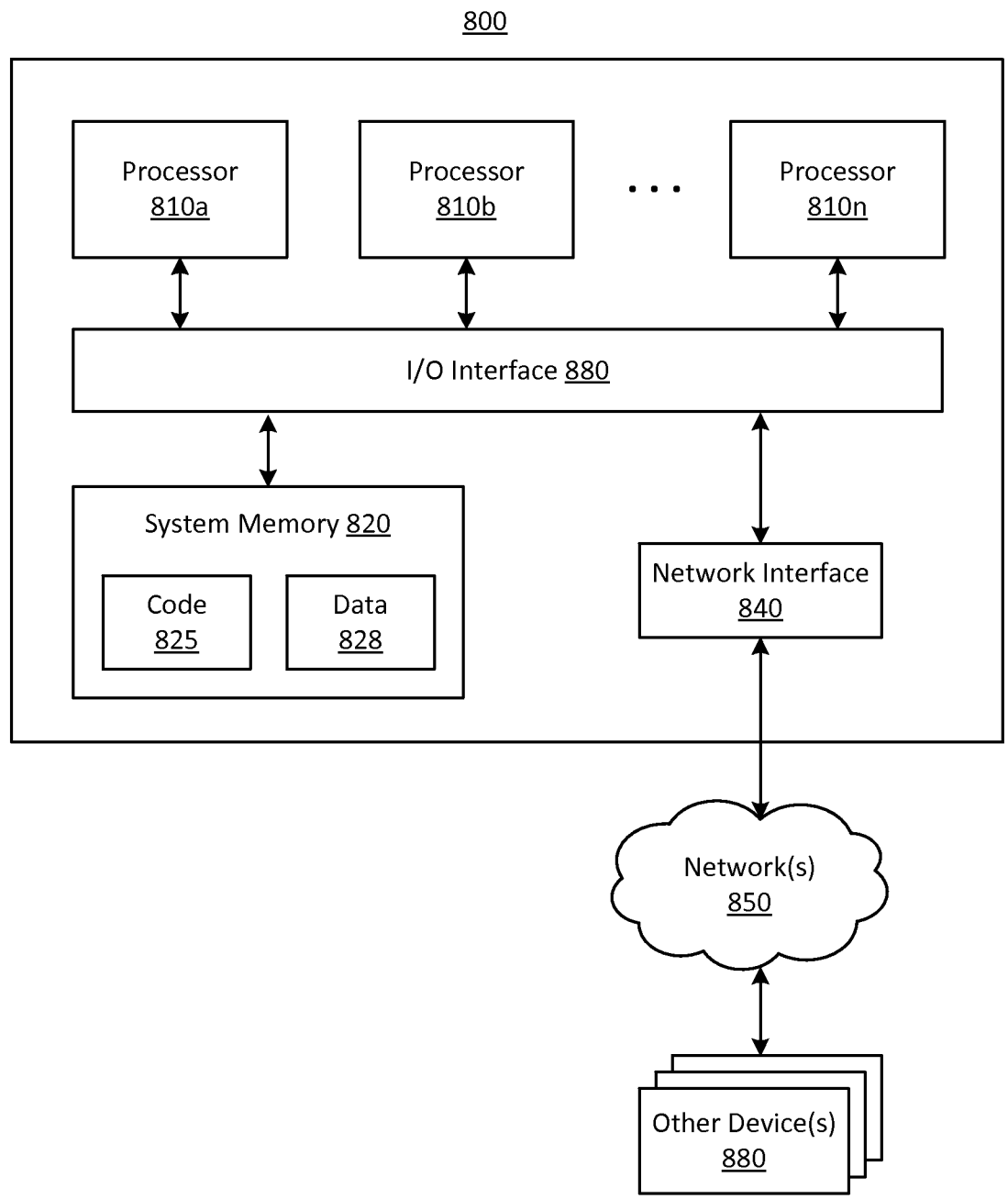
FIG. 8 is a diagram illustrating a computing environment where aspects of the present disclosure can be implemented.

In at least some embodiments, a computing device that implements a portion or all of one or more of the technologies described herein, including the techniques to implement the functionality of identification and management for disposal of storage and other electronic devices, may include a general purpose computer system that includes or is configured to access one or more computer-accessible media. FIG. 8 illustrates such a general-purpose computing device 800. In the illustrated embodiment, computing device 800 includes one or more processors 810a, 810b, and/or 810n (which may be referred herein singularly as "a processor 810" or in the plural as "the processors 810") coupled to a system memory 820 via an input/output (I/O) interface 880. Computing device 800 further includes a network interface 840 coupled to I/O interface 880.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x88, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 820 as code 825 and data 828.

In one embodiment, I/O interface 880 may be configured to coordinate I/O traffic between processor 810, system memory 820, and any peripheral devices in the device, including network interface 840 or other peripheral interfaces. In some embodiments, I/O interface 880 may perform any necessary protocol, timing, or other data transformations to convert data signals from one component (e.g., system memory 820) into a format suitable for use by another component (e.g., processor 810). In some embodiments, I/O interface 880 may include support for devices attached through various types of peripheral buses, such as a variant of the Peripheral Component Interconnect (PCI) bus standard or the Universal Serial Bus (USB) standard, for example. In some embodiments, the function of I/O interface 880 may be split into two or more separate components, such as a north bridge and a south bridge, for example. Also, in some embodiments some or all of the functionality of I/O interface 880, such as an interface to system memory 820, may be incorporated directly into processor 810.

Network interface 840 may be configured to allow data to be exchanged between computing device 800 and other device or devices 880 attached to a network or network(s) 850, such as other computer systems or devices as illustrated in FIGS. 1 through 8, for example. In various embodiments, network interface 840 may support communication via any suitable wired or wireless general data networks, such as types of Ethernet networks, for example. Additionally, network interface 840 may support communication via telecommunications/telephony networks, such as analog voice networks or digital fiber communications networks, via storage area networks, such as Fibre Channel SANs or via any other suitable type of network and/or protocol.

In some embodiments, system memory 820 may be one embodiment of a computer-accessible medium configured to store program instructions and data. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 800 via I/O interface 880. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 800 as system memory 820 or another type of memory. Further, a computer-accessible medium may include transmission media or signals such as electrical, electromagnetic or digital signals, conveyed via a communication medium such as a network and/or a wireless link, such as may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices, or special purpose computer systems, in addition to or instead of being implemented using general purpose computer systems. The term "computing device," as used herein, refers to at least all these types of devices and is not limited to these types of devices.

Figure 9:
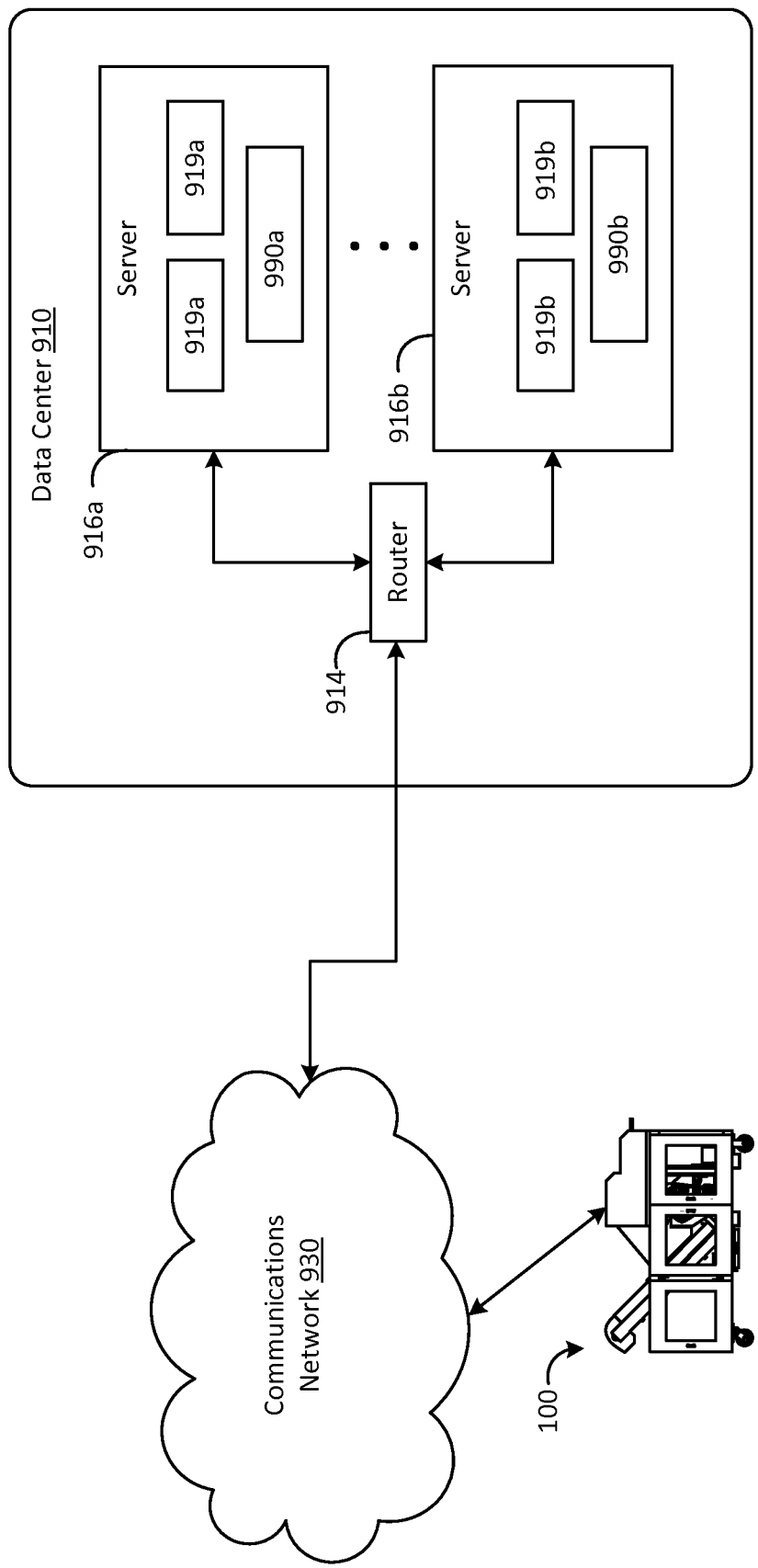
FIG. 9 is a diagram illustrating a computing environment where aspects of the present disclosure can be implemented.

FIG. 9 illustrates an example networked environment in which the embodiments described herein may be implemented. FIG. 9 is a diagram schematically illustrating an example of a data center 910 that can provide computing resources to users via user computers (not shown). Data center 910 may be configured to provide computing resources for executing applications on a permanent or an as-needed basis. The computing resources provided by data center 910 may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices, and the like.

Data center 910 may include servers 916*a* and 916*b* (which may be referred herein singularly as "a server 916" or in the plural as "the servers 916") that include various components such as disk drive assemblies 919*a* and 919*b* (which may be referred herein singularly as "a disk drive assembly 919" or in the plural as "the disk drive assemblies 919"). Other resources may be included in the servers such as processor blades 990*a* and 990*b*. Servers 916*a* and 916*b* shown in FIG. 9 may be standard servers configured appropriately for providing the computing resources described above and may provide computing resources for executing one or more applications.

Referring to FIG. 9, communications network 930 may, for example, be a locally accessible network of linked networks. Communications network 930 may provide access to the integrated system 100 for accessing data pertaining to various disk drive assemblies and other components that have been identified for disposal by the data center 910.

A router 914 may be utilized to interconnect the servers 916*a* and 916*b*. Router 914 may also be connected to communications network 930. Router 914 may manage communications within networks in data center 910, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 9 has been greatly simplified and that many more networks and networking devices may be utilized to interconnect the various computing systems disclosed herein. These network topologies and devices should be apparent to those skilled in the art.

It should also be appreciated that data center 910 described in FIG. 9 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The above described aspects of the disclosure have been described with regard to certain examples and embodiments, which are intended to illustrate but not to limit the disclosure. It should be appreciated that the subject matter presented herein extends to and encompasses such modifications and/or enhancements that will be apparent to persons skilled in the art in view of the detailed description provided herein.

The various features described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

What is claimed is:

1. A method of destroying an electronic device, the method comprising:
 sanitizing, by an integrated system, the electronic device, wherein the electronic device is included in a data center, wherein the integrated system is moved using rolling elements to a plurality of locations in the data center, wherein the data center provides computing services to a plurality of customers, and wherein the data center includes a plurality of rows of equipment racks;
 reading, by the integrated system, an information-storing tag of the electronic device;
 determining, by the integrated system and based on the reading, identification information associated with the electronic device;
 physically deforming, by the integrated system, the electronic device; and verifying, by the integrated system, identification of the electronic device, wherein the verifying comprises communicating over a wireless network with an inventory system of the data center to confirm that the electronic device is selected for destruction, wherein the inventory system of the data center is external to the integrated system, and wherein the rolling elements allow movement of the integrated system over a flat surface of the data center.

2. The method of claim 1, wherein the sanitizing comprises degaussing the electronic device.

3. The method of claim 1, wherein the information-storing tag comprises an RFID tag or optical code.

4. The method of claim 1, further comprising transferring the electronic device between components of the integrated system during said sanitizing, reading, and deforming.

5. The method of claim 1, further comprising matching the identification information with data indicative of electronic devices that have been identified for destruction.

6. The method of claim 1, further comprising generating a database of electronic devices that have been destroyed.

7. The method of claim 1, further comprising transferring, by the integrated system, destroyed electronic devices to a disposal container.

8. The method of claim 1, further comprising:

sanitizing, by the integrated system, an additional electronic device;

reading, by the integrated system, an information-storing tag of the additional electronic device;

determining, by the integrated system, identification information for the additional electronic device based on the information-storing tag of the additional electronic device;

determining that the additional electronic device has not been selected for destruction; and generating a notification that the additional electronic device has not been selected for destruction.

9. The method of claim 1, wherein at least part of the deforming is performed using rotating impact components.

* * * * *